US008601388B2

(12) United States Patent
Barrios et al.

(10) Patent No.: US 8,601,388 B2
(45) Date of Patent: Dec. 3, 2013

(54) EFFICIENTLY ADJUSTING A TIMELINE IN A TIME WINDOW

(75) Inventors: Daiv S. Barrios, San Jose, CA (US); Kevin M. McBride, Montain View, CA (US); Matthew W. Novak, San Jose, CA (US); Xi Xu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 11/971,457

(22) Filed: Jan. 9, 2008

(65) Prior Publication Data

US 2009/0177998 A1    Jul. 9, 2009

(51) Int. Cl.
*G06F 3/048*    (2013.01)

(52) U.S. Cl.
USPC .......................................... 715/784; 715/786

(58) Field of Classification Search
USPC ........... 715/784, 786, 785, 212; 345/684, 660
See application file for complete search history.

(56) References Cited

U.S. PATENT DOCUMENTS

| | | | |
|---|---|---|---|
| 5,649,085 A | 7/1997 | Lehr | |
| 5,898,431 A | 4/1999 | Webster et al. | |
| 6,282,514 B1 | 8/2001 | Kumashiro | |
| 6,366,303 B1 * | 4/2002 | Venolia | 715/856 |
| 6,486,893 B1 | 11/2002 | Ramchandani et al. | |
| 7,093,191 B1 * | 8/2006 | Jain et al. | 715/201 |
| 7,188,156 B2 | 3/2007 | Bertram et al. | |
| 7,240,297 B1 * | 7/2007 | Anderson et al. | 715/854 |
| 2003/0016248 A1 * | 1/2003 | Hayes Ubillos | 345/800 |
| 2003/0052902 A1 * | 3/2003 | Yu | 345/684 |
| 2004/0027371 A1 * | 2/2004 | Jaeger | 345/716 |
| 2004/0032427 A1 | 2/2004 | Kekki et al. | |
| 2005/0268237 A1 | 12/2005 | Crane et al. | |
| 2006/0167736 A1 | 7/2006 | Weiss | |
| 2006/0238538 A1 * | 10/2006 | Kapler et al. | 345/440 |
| 2008/0235595 A1 * | 9/2008 | Krantz et al. | 715/741 |

FOREIGN PATENT DOCUMENTS

| | | |
|---|---|---|
| JP | 56042823 | 4/1981 |
| JP | 8030686 | 2/1996 |
| WO | 03/102796 A1 | 12/2003 |

OTHER PUBLICATIONS

Microsoft Excel 2003, Microsoft, Original Release Date: Oct. 21, 2003, SP3 release date: Sep. 18, 2007.*

* cited by examiner

*Primary Examiner* — Matt Kim
*Assistant Examiner* — William Trapanese
(74) *Attorney, Agent, or Firm* — Yudell Isidore Ng Russell PLLC

(57) ABSTRACT

A method of efficiently adjusting a timeline in a time window. An application program displays a window that includes a graphical user interface (GUI), at least a portion of time-based data, a timeline, and a slider bar. If a click and drag occurs while a cursor is over the slider bar, the application moves the slider bar and changes a position of data displayed in the window by an amount corresponding to the movement. The application increases the timeline scale if the slider bar reaches an edge of the timeline. If a click and drag occurs while the cursor is over a handle on an edge of the slider bar, the application resizes the slider bar and adjusts the timeline scale to correspond to the slider bar scale. If additional time-based data is available and is not displayed, the application displays an indicator on a corresponding edge of the timeline.

23 Claims, 4 Drawing Sheets

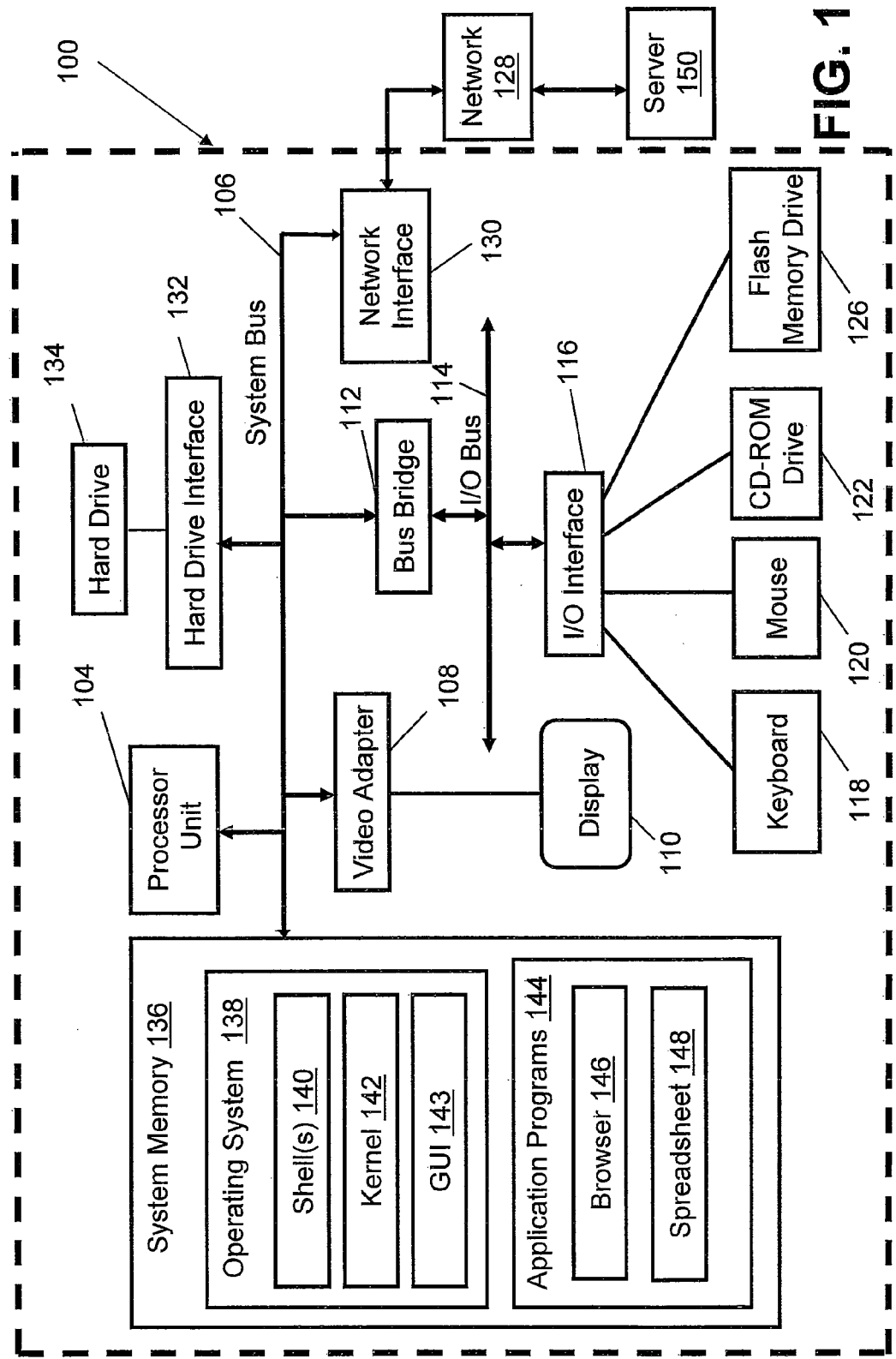

EFFICIENTLY ADJUSTING A TIMELINE IN A TIME WINDOW

BACKGROUND OF THE INVENTION

1. Technical Field

The present invention relates in general to computer application programs and in particular to graphical user interface (GUI) applications. Still more particularly, the present invention relates to an improved method and system for efficiently adjusting a timeline in a time window of a GUI.

2. Description of the Related Art

Computer application programs often use a graphical user interface (GUI) to provide output data to a user in a graphical format, such as a chart or table that may include data from a pre-defined time period (i.e., a timeline). Application programs may also enable a user to define a beginning and an end of a timeline within a GUI. For example, a user who is analyzing the performance of a stock may select a start date and an end date of a period in which to display the stock price in a chart or table. Similarly, a user who is making travel reservations may select a departure and a return date and time. A user who is analyzing performance metrics in a database system also typically uses a GUI to select a start and an end of a period of data that an application program subsequently displays in a chart.

An application that enables users to select the start and end of a time window in a quick and easy manner can improve user productivity and satisfaction. However, conventional applications require numerous (e.g., a dozen or more) keystrokes and/or mouse clicks to completely define both the start and end of a time window. As the number of keystrokes and/or mouse clicks required to define a time window increases, the efficiency of the process decreases and the possibility of a data entry error occurring increases.

SUMMARY OF AN EMBODIMENT

Disclosed are a method, system, and computer program product for efficiently adjusting a timeline in a time window. An application program displays a time window that includes a graphical user interface (GUI) and at least a portion of time-based data. The time window includes a timeline and a slider bar. If a click and drag input is received from an input device while a cursor is located over the slider bar, the application program moves the slider bar along the timeline and changes a position of the data displayed in the time window by an amount corresponding to the movement. The application program increases the scale of the timeline if the slider bar reaches an edge of the timeline. If a click and drag input is received from an input device while the cursor is over a handle on an edge of the slider bar, the application program resizes the slider bar and adjusts the scale of the time window to correspond to a scale of the slider bar. If additional time-based data is available from a data source and the additional data is not displayed, the application program displays a graphical indicator of additional data on a corresponding edge of the timeline.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 depicts a high level block diagram of an exemplary computer, according to an embodiment of the present invention;

DETAILED DESCRIPTION OF AN ILLUSTRATIVE EMBODIMENT

Figure 2A:
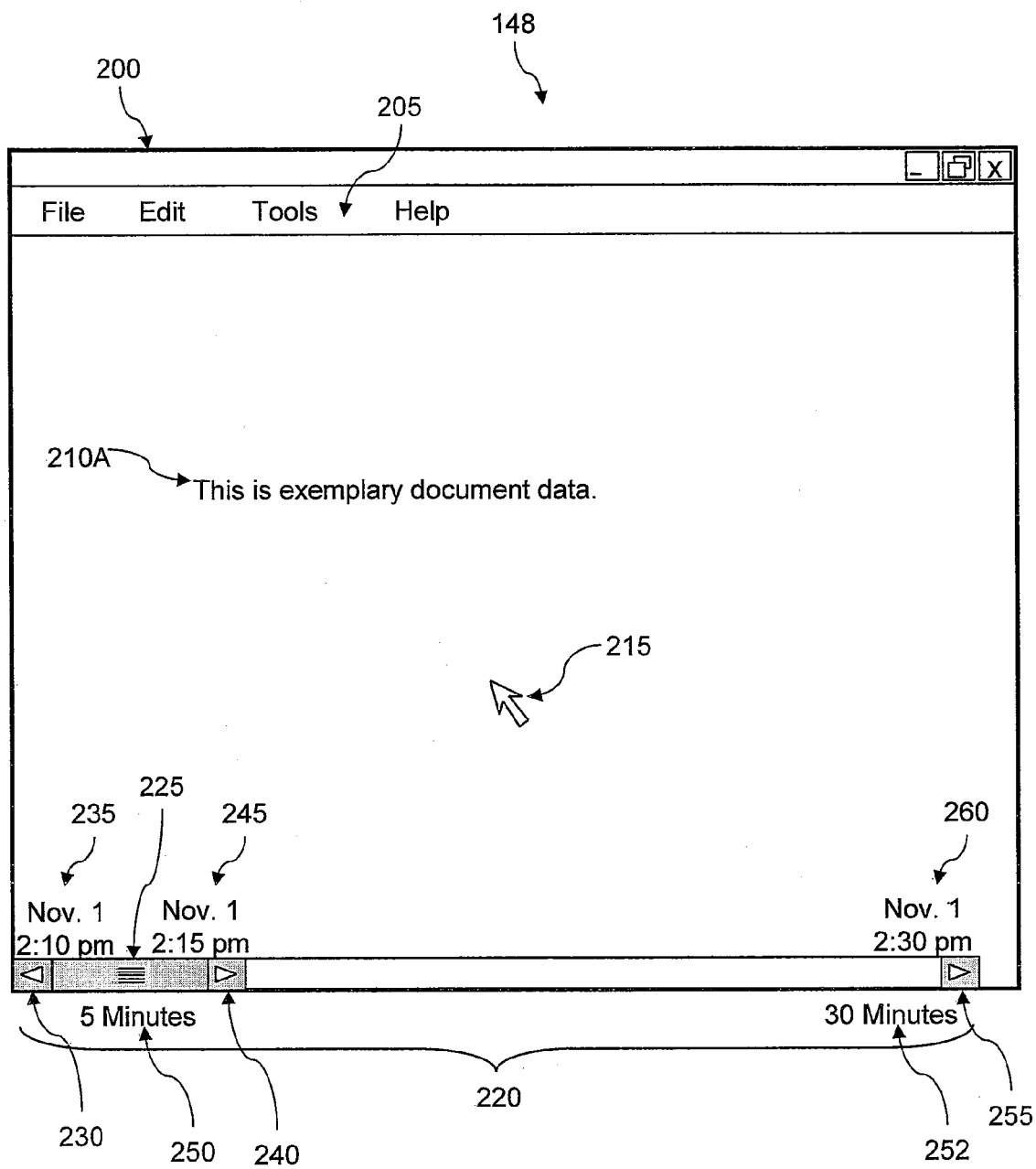
FIG. 2A illustrates a first view of an exemplary graphical user interface (GUI), according to an embodiment of the present invention.

The present invention provides a method, system, and computer program product for efficiently adjusting a timeline in a time window.

With reference now to FIG. 1, there is depicted a high level block diagram of an exemplary computer, according to an embodiment of the present invention. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes Operating System (OS) 138 and application programs 144.

OS 138 includes shell 140, for providing transparent user access to resources such as application programs 144. Generally, shell 140 (as it is called in UNIX®) is a program that provides an interpreter and an interface between the user and the operating system. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146 and spreadsheet 148. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. In one embodiment, spreadsheet 148 performs the functions illustrated in FIG. 3, which is described below.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

With reference now to FIG. 2A, there is depicted a first view of an exemplary GUI, according to an embodiment of the present invention. As shown, an application program, such as spreadsheet 148 (FIG. 1), includes window 200. Window 200 includes GUI 143 (FIG. 1), which includes heading field 205. Heading field 205 includes one or more pull down menus (e.g., "file", "edit", "tools", and "help") that are accessible via cursor 215 and/or hot-key combinations entered on keyboard 118 (FIG. 1). Cursor 215 is controlled by mouse 120 (FIG. 1). Window 200 also includes time-based document data 210A, which may correspond to numerical data, text data, and/or other time-based data types from an external data source (e.g., server 150) or a local data file stored within system memory 136.

According to the illustrative embodiment, window 200 includes timeline 220, which is configured in a horizontal position at the bottom of window 200. In another embodiment, timeline 220 may be a vertical timeline and may be located on a right or left side of window 200. Document data 210A is displayed above timeline 220, which varies in scale according to the amount of data displayed in window 200 and/or the size of window 200. For example, if all available document data 210A is displayed in window 200, timeline 220 is displayed with a large scale that corresponds to the entire amount of document data 210A. However, if additional available data is not currently displayed in window 220 (i.e., some data is "invisible" beyond the edge of window 200), spreadsheet 148 automatically configures timeline 220 to include a smaller scale that corresponds only to the visible data currently displayed in window 200.

Figure 3:
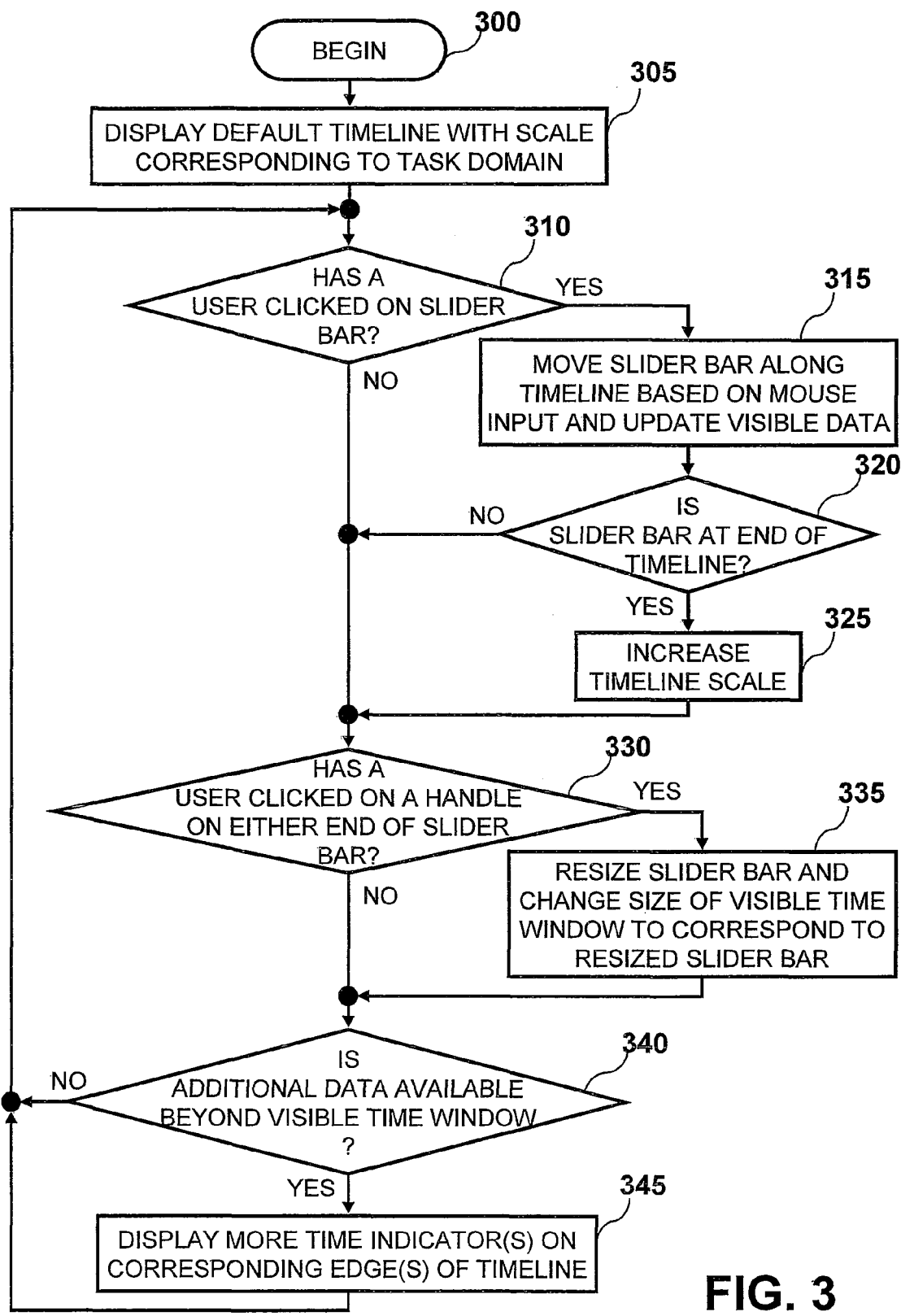
FIG. 3 is a high level logical flowchart of an exemplary method of efficiently adjusting a timeline in a time window, according to an embodiment of the invention.

In one embodiment, timeline 220 includes slider bar 225, which a user of computer 100 may move and/or resize using an input device, such as mouse 120, to adjust the amount and/or scale, respectively, of document data 210A displayed in window 200. Slider bar 225 may include a "graphically-textured" central area. Slider bar 225 may occupies a portion of timeline 220 that corresponds to the scale of slider bar 225. Slider bar 225 is initially positioned in a default position at the left edge of the visible data displayed in window 200 (i.e., the default position corresponds to the earliest visible data in chronological order). A user of computer 100 may change the position of slider bar 225 along timeline 220 by using cursor 215 to click and drag slider bar 225 to an area along timeline 220 that was not previously occupied by slider bar 225 (i.e., a "blank" or "empty" area). Slider bar 225 includes left slider handle 230 and right slider handle 240. A user of computer 100 may decrease or increase the size (i.e., scale) of slider bar 225 by using cursor 215 to click and drag left slider handle 230 or right slider handle 240 inward or outward, respectively, with respect to slider bar 225. Spreadsheet 148 automatically adjusts the scale of timeline 220 to match the scale slider bar 225, as illustrated in FIG. 3, which is described below.

According to the illustrative embodiment, scale label 250 is positioned in close proximity to slider bar 225. Scale label 250 identifies the amount of time represented by the length of slider bar 225 with respect to the length of timeline 220 (e.g., "5 minutes"). Slider bar 225 also includes start timestamp label 235 (e.g., "November 1 2:10 pm") and end timestamp label 245 (e.g., "November 1 2:15 pm"), which are positioned in close proximity to left slider handle 230 and right slider handle 240, respectively. Similarly, timeline 220 includes right timeline handle 255 and timeline end label 260. Timeline length label 252 is positioned in close proximity to right timeline handle 255. Timeline length label 252 identifies the amount of time represented by the visible length of timeline 220 (e.g., "30 minutes"). Right timeline handle 255 enables a user to adjust the size of timeline 220, as illustrated in FIG. 3, which is described below.

Figure 2B:
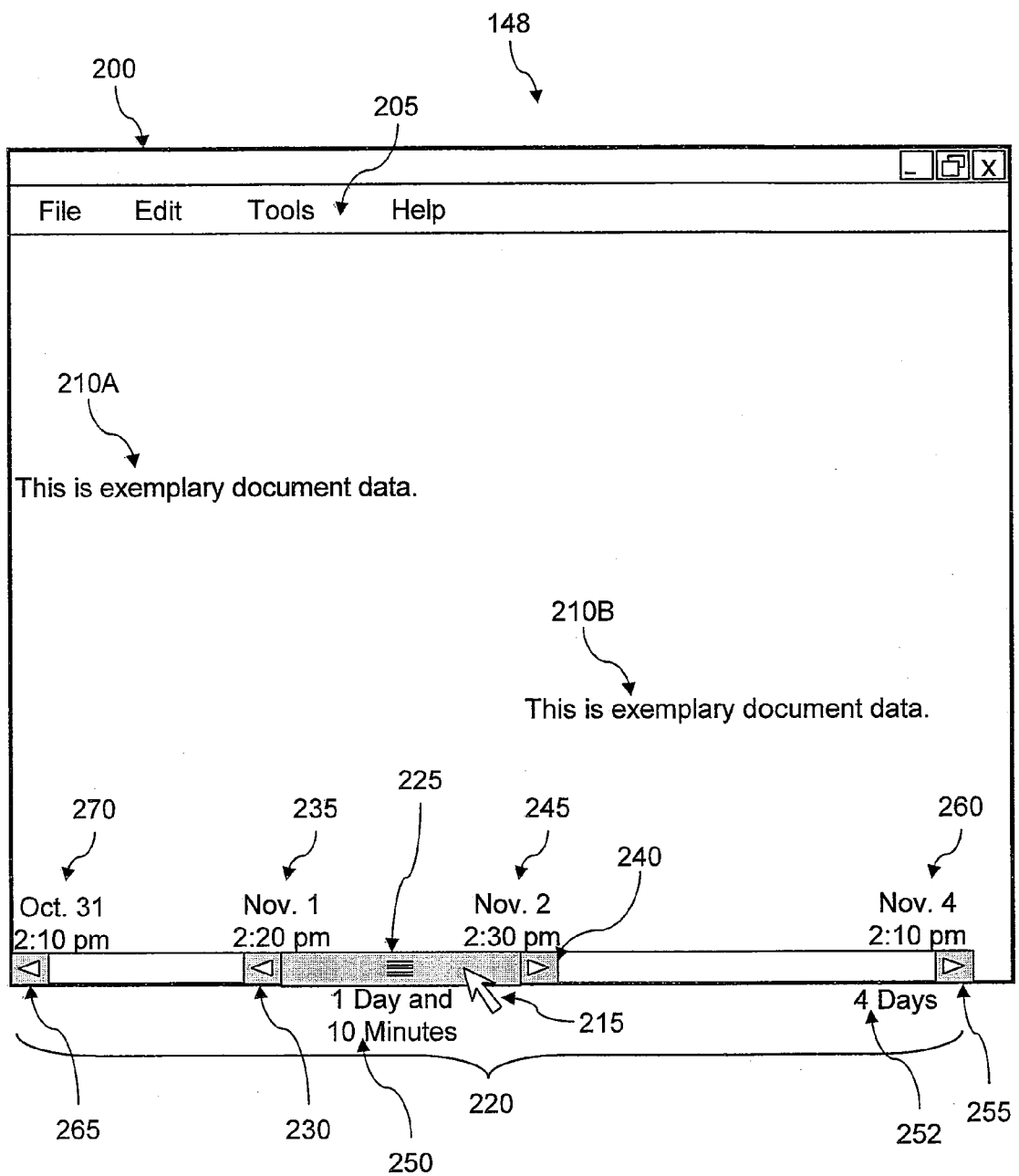
FIG. 2B illustrates a second view of the exemplary GUI of FIG. 2A, according to an embodiment of the present invention.

With reference now to FIG. 2B, there is depicted a second view of the exemplary GUI of FIG. 2A, according to an embodiment of the present invention. As shown in the second view, a user of computer 100 has clicked on slider bar 225 using cursor 215 and dragged slider bar 225 to a new location along timeline 220, thereby revealing document data 210B and causing spreadsheet 148 to adjust the position of document data 210A towards the left side of window 200. As shown, a user has clicked on left slider handle 230 or right slider handle 240 of slider bar 225 and resized slider bar 225 (e.g., from a scale of "5 minutes" to "1 day and 10 minutes"), thereby triggering spreadsheet 148 to automatically adjust the scale of timeline 220. The method of efficiently adjusting a timeline in a time window is illustrated in FIG. 3, which is described below.

In one embodiment, timeline 220 may also include left timeline handle 265, which enables a user to adjust the visible amount of time-based data in window 200. For example, if a user moves slider bar 225 away from the default position and additional data (i.e., "invisible" data) corresponding to a time prior to the beginning of timeline 220 is available, spreadsheet 148 displays left timeline handle 265 and timeline start label 270 on the left-most side of timeline 220. Left timeline handle 265 enables the user to selectively adjust timeline 220, such that the visible portion of timeline 220 includes the "earlier" data.

Turning now to FIG. 3, there is illustrated a high level logical flowchart of an exemplary method of efficiently adjusting a time window in a timeline. The process begins at block 300 in response to one of application programs 144 (e.g., spreadsheet 148 of FIG. 1) generating a window that includes a timeline, such as timeline 220 (FIGS. 2A-2B). Spreadsheet 148 displays a default visible timeline that is appropriate for the task domain (i.e., timeline 220 and slider bar 225 are scaled corresponding to the available time-based data), as depicted in block 305. At block 310, spreadsheet 148 determines whether or not a user of computer 100 (FIG. 1) has provided input with an input device, such as mouse 120, to position cursor 215 over slider bar 225 and subsequently clicked on slider bar 225. If a user of computer 100 has not clicked on slider bar 225, the process proceeds to block 330.

If a user of computer 100 has clicked on slider bar 225, spreadsheet 148 moves slider bar 225 along timeline 220 based on the distance the user drags slider bar 225, and spreadsheet 148 automatically updates the time-based data displayed within window 200 corresponding to the movement of slider bar 225, as shown in block 315. At block 320, spreadsheet 148 determines whether or not slider bar 225 has reached an end of timeline 220 (i.e., whether slider bar 225 is touching right timeline handle 255 or left timeline handle 265). If slider bar 225 is not at an end of timeline 220, the process proceeds to block 330. If slider bar 225 is at an end of timeline 220 and additional currently un-displayed (i.e., "invisible") data is available beyond the end of timeline 220, spreadsheet 148 increases the values of timeline end label 260 and timeline length label 252, thereby increasing the scale of timeline 220, as depicted in block 325. In one embodiment, spreadsheet 148 extends the scale of timeline 220 by an additional amount of at least the amount of time corresponding to the length of slider bar 225 or an amount of time that corresponds to a multiple of the scale of slider bar 225. Spreadsheet 148 may also automatically increase the scale of slider bar 225 while extending timeline 220.

At block 330, spreadsheet 148 determines whether or not a user of computer 100 has used mouse 120 to position cursor 215 over left slider handle 230 or right slider handle 240 and click on left slider handle 230 or right slider handle 240. If a user has not clicked on left slider handle 230 or right slider handle 240, the process proceeds to block 340. If a user has clicked on left slider handle 230 or right slider handle 240, spreadsheet 148 resizes slider bar 225 by an amount corresponding to the movement of cursor 215 during a click and drag, as shown in block 335. Spreadsheet 148 may automatically change the scale of timeline 220 (i.e., the amount of data included in the visible time window) by an amount that corresponds to the change in the size (i.e., scale) of slider bar 225.

At block 340, spreadsheet 148 determines whether or not additional time-based data beyond the start and/or end of timeline 220 (i.e., "invisible" data) is available from a data source (e.g., an external device connected to network 128 or a data file stored within system memory 136) that provided the time-based data currently displayed in window 200. If additional time-based data beyond the start and/or end of timeline 220 is not available, the process returns to block 310. If additional time-based data beyond the start and/or end of timeline 220 is available, spreadsheet 148 displays a "more time indicator" on one or more edges of timeline 220 (e.g., left timeline handle 265 and/or right timeline handle 255). The process subsequently returns to block 310, and spreadsheet 148 continues to adjust timeline 220, slider bar 225, and/or time-based data in window 200 based on user input.

The present invention thus provides a method of efficiently adjusting a timeline in a time window that minimizes a number of mouse clicks and/or keystrokes required to select and/or adjust the time window. An application program, such as spreadsheet 148 (FIG. 1), displays a time window that includes at least a portion of time-based data. The time window includes timeline 220 and slider bar 225 (FIGS. 2A-2B). If a click and drag input is received while cursor 215 is located over slider bar 225, spreadsheet 148 moves slider bar 225 along timeline 220 and changes a position of the data displayed in the time window by an amount corresponding to the movement. Spreadsheet 148 increases the scale of timeline 220 if slider bar 225 reaches an edge of timeline 220. If a click and drag input is received while cursor 215 is over a handle on an edge of slider bar 225, spreadsheet 148 resizes slider bar 225 and adjusts the scale of the time window to correspond to a scale of slider bar 225. If additional time-based data is available from a data source and the additional data is not displayed, spreadsheet 148 displays a graphical indicator of additional data on a corresponding edge of timeline 220.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer network with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   displaying a time window in a graphical user interface (GUI), wherein said time window includes time-based data that can be partially or fully displayed within the time window based on a scale factor of the time window, and wherein said time window includes (a) a timeline visible within said time window and (b) a slider bar that occupies a portion of said timeline, wherein a portion of time-based data that is displayed in said time window corresponds to data for a specific time period along the timeline relative to a current position of said slider bar within a displayed portion of the timeline, wherein in response to only a portion of the time-based data being displayed within the time window, a displayed portion of time-based data displayed within the time window dynamically changes based on movement of said slider bar; and
   in response to a click and drag input in a same direction as a directional flow of the timeline while a cursor of the GUI is located over said slider bar:
      moving said slider bar along said timeline from an initial position towards a next position on said timeline;
      changing a which portion of the time-based data is displayed in said time window by a spatial amount corresponding to an amount and direction of movement of said slider bar; and
      increasing a scale of said timeline and concurrently increasing a corresponding amount of time-based data that is displayed within the time window in response to the movement of said slider bar causing the slider bar to reach a displayed edge of said timeline within the time window, wherein additional time-based data that are available for display but are not presently being displayed are brought into and displayed within the time window in response to the slider bar being moved to and reaching the edge of the timeline.

2. The method of claim 1, wherein said timeline further comprises one or more of:

a numerical scale label located adjacent to said slider bar, wherein said numerical scale label corresponds to an amount of time represented by a length of said slider bar with respect to a length of said timeline;
a numerical start timestamp label located adjacent to a first handle of said slider bar;
a numerical end timestamp label located adjacent to a second handle of said slider bar, wherein the second handle is opposed to the first handle; and
a numerical timeline end label located adjacent to an edge of said timeline representing the edge of the timeline that provides a last displayed time relative to other earlier times along the timeline; and
the method further comprises:
  automatically changing at least one of the labels in response to changing an amount of time-based data displayed within the time window, wherein the time-based data is change via one of manipulating a size of the slider bar to change a scale of the timeline and moving the slider bar to the edge of the timeline; and
  concurrently changing the at least one label within the time window to reflect a new value corresponding to information that is represented by the at least one label.

3. The method of claim 2, wherein said increasing further comprises:
  increasing said scale of said timeline by an amount of time that corresponds to said length of said slider bar; and
  concurrently increasing a value of the timeline end label and a value of the timeline length label displayed within the time window.

4. The method of claim 2, wherein said increasing further comprises:
  increasing said scale of said timeline by an amount of time that corresponds to a multiple of said scale of said slider bar; and
  concurrently increasing a value of the timeline end label and a value of the timeline length label displayed within the time window to correspond to the increase in the scale by the multiple of said scale of said slider bar.

5. The method of claim 1, further comprising:
in response to a click and drag input while said cursor is located over a handle on an edge of said slider bar:
  resizing said slider bar; and
  adjusting said scale of said time window to correspond to a scale of said slider bar, wherein the scale of the slider bar corresponds to the size of the slider bar, and wherein an adjustment in the scale of the time window is proportional to the change in size of the slider bar from (a) a first size prior to the resizing to (b) a second size after the resizing.

6. The method of claim 1, further comprising:
in response to a determination that additional time-based data is available from a data source and said additional time-based data is not displayed in said time window:
  displaying, on a first edge of said timeline, a first graphical timeline handle, which indicates that additional time-based data lies beyond a first time corresponding to an earliest displayed start time of the timeline; and
  displaying, on a second edge of said timeline, a second graphical timeline handle, which indicates that additional time-based data lies beyond a second time corresponding to a last displayed end time of the timeline.

7. The method of claim 1, further comprising:
automatically increasing said scale of said slider bar in response to extending said timeline; and
concurrently increasing a value of the timeline end label and a value of the timeline length label displayed within the time window.

8. The method of claim 1, wherein:
the portion of time-based data varies in scale according to an amount of data displayed in the time window and a size of the window, and increasing the scale includes increasing a scale of said timeline while displaying a larger amount of time-based data displayed within the time window results in a reduction in the size of the time-based data; and
said method further comprising:
  in response to simultaneously displaying all available document data within the time window, displaying the timeline with a large scale that corresponds to an entire amount of document data; and
  in response to there being additional available data that is not currently displayed in the time window, automatically configuring the timeline to include a smaller scale that corresponds to only the visible data.

9. A computer system comprising:
a processor unit;
a memory coupled to said processor unit; and
an application program within said memory, wherein said application program displays a graphical user interface (GUI), and wherein said application program executes on the processing unit and configures the computer system to:
  display a time window that includes time-based data that can be partially or fully displayed within the time window based on a scale factor of the time window, wherein said time window includes (a) a timeline visible within said time window and (b) a slider bar that occupies a portion of said timeline, wherein a portion of time-based data that is displayed in said time window corresponds to data for a specific time period along the timeline relative to a current position of said slider bar within a displayed portion of the timeline, wherein in response to only a portion of the time-based data being displayed within the time window, a displayed portion of time-based data displayed within the time window dynamically changes based on movement of said slider bar; and
  in response to a click and drag input in a same direction as a directional flow of the timeline while a cursor of the GUI is located over said slider bar:
    move said slider bar along said timeline from an initial position towards a next position on said timeline;
    change a which portion of the time-based data is displayed in said time window by a spatial amount corresponding to an amount and direction of movement of said slider bar; and
    increase a scale of said timeline and concurrently increasing a corresponding amount of time-based data that is displayed within the time window in response to the movement of said slider bar causing the slider bar to reach a displayed edge of said timeline within the time window, wherein additional time-based data that are available for display but are not presently being displayed are brought into and displayed within the time window in response to the slider bar being moved to and reaching the displayed edge of the timeline.

10. The computer system of claim 9, wherein said timeline further comprises at least one of:
a numerical scale label located adjacent to said slider bar, wherein said numerical scale label corresponds to an amount of time represented by a length of said slider bar with respect to a length of said timeline;

a numerical start timestamp label located adjacent to a first handle of said slider bar;

a numerical end timestamp label located adjacent to a second handle of said slider bar, wherein the second handle is opposed to the first handle; and a numerical timeline end label located adjacent to an edge of said timeline representing the edge of the timeline that provides a last displayed time relative to other earlier times along the timeline; and the application program further configures the computer system to:

automatically change at least one of the labels in response to changing an amount of time-based data displayed within the time window, wherein the time-based data is change via one of manipulating a size of the slider bar to change a scale of the timeline and moving the slider bar to the edge of the timeline; and concurrently change the at least one label within the time window to reflect a new value corresponding to information that is represented by the at least one label.

11. The computer system of claim 10, wherein said increasing further comprises the application program configuring the computer system to:

increase said scale of said timeline by an amount of time that corresponds to said length of said slider bar; and concurrently increase a value of the timeline end label and a value of the timeline length label displayed within the time window.

12. The computer system of claim 10, wherein said increasing further comprises the application program configuring the computer system to:

increase said scale of said timeline by an amount of time that corresponds to a multiple of said scale of said slider bar; and concurrently increase a value of the timeline end label and a value of the timeline length label displayed within the time window to correspond to the increase in the scale by the multiple of said scale of said slider bar.

13. The computer system of claim 9, wherein the application program further configures the computer system to:

in response to a click and drag input while said cursor is located over a handle on an edge of said slider bar:

resize said slider bar; and adjust said scale of said time window to correspond to a scale of said slider bar, wherein the scale of the slider bar corresponds to the size of the slider bar, and wherein an adjustment in the scale of the time window is proportional to the change in size of the slider bar from (a) a first size prior to the resizing to (b) a second size after the resizing.

14. The computer system of claim 9, wherein the application program further configures the computer system to:

in response to a determination that additional time-based data is available from a data source and said additional time-based data is not displayed in said time window:

display, on a first edge of said timeline, a first graphical timeline handle, which indicates that additional time-based data lies beyond a first time corresponding to an earliest displayed start time of the timeline; and display, on a second edge of said timeline, a second graphical timeline handle, which indicates that additional time-based data lies beyond a second time corresponding to a last displayed end time of the timeline.

15. The computer system of claim 9, the application program further configuring the computer system to:

automatically increase said scale of said slider bar when extending said timeline; and concurrently increase a value of the timeline end label and a value of the timeline length label displayed within the time window.

16. The computer system of claim 9, wherein:

the portion of time-based data varies in scale according to an amount of data displayed in the time window and a size of the window, and increasing the scale includes the computer system increasing a scale of said timeline while displaying a larger amount of time-based data displayed within the time window results in a reduction in the size of the time-based data; and said application program further configures the computer system to:

in response to simultaneously displaying all available document data within the time window, display the timeline with a large scale that corresponds to an entire amount of document data; and in response to there being additional available data that is not currently displayed in the time window, automatically configure the timeline to include a smaller scale that corresponds to only the visible data.

17. A computer program product comprising:

a non-transitory computer storage medium; and program code on said computer storage medium that that when executed provides the functions of:

displaying a time window in a graphical user interface (GUI), wherein said time window includes at least a portion of time-based data, and wherein said time window includes a timeline configured in a horizontal position at the bottom of said time window and a slider bar that occupies a portion of said timeline, wherein said portion of time-based data displayed in said time window corresponds to movement and a current position of said slider bar; and in response to a click and drag input in a same direction as a directional flow of the timeline while a cursor of the GUI is located over said slider bar:

moving said slider bar along said timeline from an initial position towards a next position on said timeline;

changing a which portion of the time-based data is displayed in said time window by a spatial amount corresponding to an amount and direction of movement of said slider bar; and increasing a scale of said timeline and concurrently increasing a corresponding amount of time-based data that is displayed within the time window in response to the movement of said slider bar causing the slider bar to reach a displayed edge of said timeline within the time window, wherein additional time-based data that are available for display but are not presently being displayed are brought into and displayed within the time window in response to the slider bar being moved to and reaching the displayed edge of the timeline.

18. The computer program product of claim 17, wherein said code for said timeline further comprises code for providing at least one of:

a numerical scale label located adjacent to said slider bar, wherein said numerical scale label corresponds to an amount of time represented by a length of said slider bar with respect to a length of said timeline;

a numerical start timestamp label located adjacent to a first handle of said slider bar;

a numerical end timestamp label located adjacent to a second handle of said slider bar, wherein the second handle is opposed to the first handle; and a numerical timeline end label located adjacent to an edge of said timeline representing the edge of the timeline that provides a last displayed time relative to other earlier times along the timeline; and the program code further provides the functions of:

automatically changing at least one of the labels in response to changing an amount of time-based data displayed within the time window, wherein the time-based data is change via one of manipulating a size of the slider bar to change a scale of the timeline and moving the slider bar to the edge of the timeline; and concurrently changing the at least one label within the time window to reflect a new value corresponding to information that is represented by the at least one label.

19. The computer program product of claim 18, wherein said program code for said increasing further comprises program code for:

increasing said scale of said timeline by an amount of time that corresponds to said length of said slider bar; and concurrently increasing a value of the timeline end label and a value of the timeline length label displayed within the time window.

20. The computer program product of claim 18, wherein said program code for said increasing further comprises program code for:

increasing said scale of said timeline by an amount of time that corresponds to a multiple of said scale of said slider bar; and concurrently increasing a value of the timeline end label and a value of the timeline length label displayed within the time window to correspond to the increase in the scale by the multiple of said scale of said slider bar.

21. The computer program product of claim 17, said program code further comprising program code for:

in response to a click and drag input while said cursor is located over a handle on an edge of said slider bar:
resizing said slider bar; and
adjusting said scale of said time window to correspond to a scale of said slider bar, wherein the scale of the slider bar corresponds to the size of the slider bar, and wherein an adjustment in the scale of the time window is proportional to the change in size of the slider bar from (a) a first size prior to the resizing to (b) a second size after the resizing; and in response to a determination that additional time-based data is available from a data source and said additional time-based data is not displayed in said time window:

displaying, on a first edge of said timeline, a first graphical timeline handle, which indicates that additional time-based data lies beyond a first time corresponding to an earliest displayed start time of the timeline; and displaying, on a second edge of said timeline, a second graphical timeline handle, which indicates that additional time-based data lies beyond a second time corresponding to a last displayed end time of the timeline.

22. The computer program product of claim 17, said program code further comprising program code for:

automatically increasing said scale of said slider bar when extending said timeline; and concurrently increasing a value of the timeline end label and a value of the timeline length label displayed within the time window.

23. The computer program product of claim 17, wherein:

the portion of time-based data varies in scale according to an amount of data displayed in the time window and a size of the window, and the program code for increasing the scale includes code for increasing a scale of said timeline while displaying a larger amount of time-based data displayed within the time window results in a reduction in the size of the time-based data; and said computer program product further comprises program code for:

in response to simultaneously displaying all available document data within the time window, display the timeline with a large scale that corresponds to an entire amount of document data; and in response to there being additional available data that is not currently displayed in the time window, automatically configuring the timeline to include a smaller scale that corresponds to only the visible data.

\* \* \* \* \*